(12) United States Patent
Riley

(10) Patent No.: US 7,110,413 B2
(45) Date of Patent: Sep. 19, 2006

(54) DOWNSTREAM BROADCAST PCI SWITCH

(75) Inventor: Dwight D. Riley, Houston, TX (US)

(73) Assignee: Hewlett-Packard Development Company, Houston, TX (US)

( * ) Notice: Subject to any disclaimer, the term of this patent is extended or adjusted under 35 U.S.C. 154(b) by 1006 days.

(21) Appl. No.: 10/038,793

(22) Filed: Dec. 31, 2001

(65) Prior Publication Data

US 2003/0123461 A1 Jul. 3, 2003

(51) Int. Cl.
*H04L 12/28* (2006.01)
(52) U.S. Cl. .................... 370/401; 370/392
(58) Field of Classification Search ............. 370/257, 370/389, 401, 402, 419; 710/38, 305, 312, 710/314, 316
See application file for complete search history.

(56) References Cited

U.S. PATENT DOCUMENTS 6,275,888 B1 * 8/2001 Porterfield ............... 710/312

2003/0115391 A1 * 6/2003 Ajanovic et al. ........... 710/107

* cited by examiner

*Primary Examiner*—Brian Nguyen

(57) ABSTRACT

An interconnect switch provides full PCI compatibility while increasing performance via concurrency. The switch contains a primary bridge on a primary port. Secondary ports of the switch can be connected to secondary bridges and end devices. The switch can shadow registers associated with the secondary bridges. A transaction with a target address behind a secondary bridge is directly routed to the secondary port associated with the secondary bridge, using the shadowed registers. A transaction with a target address not behind a secondary bridge is routed to each of the other secondary ports. The transaction can be broadcast to all of the non-bridge secondary ports or can be routed successively to each of the non-bridge secondary ports until accepted. A tuning process can use positive acknowledgment of a transaction by an end device connected to a secondary port to directly route similar transactions to the same secondary port.

18 Claims, 7 Drawing Sheets

DOWNSTREAM BROADCAST PCI SWITCH

CROSS-REFERENCE TO RELATED APPLICATIONS

This application is related to commonly owned U.S. patents and patent applications, which are hereby incorporated in their entirety by reference for all purposes:

U.S. Pat. No. 6,266,731, entitled "HIGH SPEED PERIPHERAL INTERCONNECT APPARATUS, METHOD AND SYSTEM," by Dwight Riley and Christopher J. Pettey.

STATEMENTS REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to computer interconnect architectures and in particular to a technique for providing a concurrent switch interconnect while maintaining compatibility with existing interconnect protocols.

2. Description of the Related Art

Conventional computer systems have used interconnect busses such as Peripheral Component Interconnect (PCI) busses to connect multiple devices to the computer system. In many configurations, bridges are used to segment a single logical interconnect system into multiple bus segments. Recently, the availability of switching technology has introduced devices, such as crossbar switches, which can be placed between two interconnect bus segments similar to a PCI-PCI bridge, providing compatibility with the PCI interconnect specification, but providing a concurrent switch interconnect.

However, to maintain compatibility with the PCI specification, conventional switches have needed to include significant resources in a routing engine of the switch, increasing design complexity and cost of chip design, and decreasing the performance of the switch. System designers have desired a way to provide the advantages of a switched interconnect without the high complexity of current switches, while maintaining compatibility with existing interconnect protocols.

BRIEF SUMMARY OF THE INVENTION

Briefly, an interconnect switch provides compatibility with existing interconnect specifications while reducing complexity within the switch. Transactions are identified as a bridge transaction or a non-bridge transaction. Bridge transactions are routed to a secondary port of the switch connected to a bridge. Non-bridge transactions are routed to a plurality of end-device secondary ports.

In one embodiment, a target address of the transaction is used to identify bridge transactions. Configuration registers of the bridge are shadowed in the switch. If the target address is mapped by the shadowed registers, the transaction is identified as a bridge transaction. Otherwise, the transaction is identified as a non-bridge transaction. The configuration registers shadowed by the switch can be base address registers (BARs) of a PCI-to-PCI bridge, which map addresses associated with a secondary interconnect of the bridge.

In a further embodiment, the switch shadows registers of the bridge by snooping configuration transactions that configure BARs of the bridge, copying the BAR information into shadow registers of the routing engine.

In one embodiment, the switch routes non-bridge transactions to the non-bridge secondary ports of the switch by broadcasting non-bridge transactions to all of the end-device secondary ports of the switch. In another embodiment, the switch successively routes non-bridge transactions to each of the end-device secondary ports of the switch, until the non-bridge transaction is claimed by a first end-device connected to a first end-device port of the end device secondary ports.

In a further embodiment, the first end device has an associated address range. Further transactions with a target address within the associated address range are routed directly to the first port, while other further transactions are successively routed to the remaining end-device secondary ports until claimed by a second end device.

In one embodiment, the transaction is a downstream transaction. In another embodiment, the transaction is a peer-to-peer transaction.

BRIEF DESCRIPTION OF THE SEVERAL VIEWS OF THE DRAWINGS

A better understanding of the present invention can be obtained when the following detailed description of the preferred embodiment is considered in conjunction with the following drawings, in which.

DETAILED DESCRIPTION OF THE INVENTION

The present invention provides a technique for enhancing the operation of computer system interconnect busses that conform to the general *PCI Local Bus Specification, Revision* 2.2 (the PCI specification) together with the general *PCI-X Addendum to the PCI Local Bus Specification* 1.0 (the PCI-X specification), both of which are incorporated by reference herein in their entirety, (hereinafter PCI busses), as well as logic circuits and signal protocols thereof. For illustrative purposes, embodiments are described herein for computer systems using Intel Corporation microprocessor architectures, and certain terms and references are specific to such processor platforms. PCI and the enhancements described herein, however, are hardware independent, and may be used with any host computer designed for this interconnect standard. As will be appreciated by those skilled in the art of computer systems, the disclosed embodiments can be adapted and applied to any computer platform utilizing the PCI standard. Further, although the following is described in terms of PCI busses, other bus architectures and protocols could also be used, such as the 3GIO bus architecture and protocol promoted by Intel Corporation, Microsoft Corporation, IBM Corporation, Compaq Computer Corporation, and Dell Computer Corporation.

Figure 1:
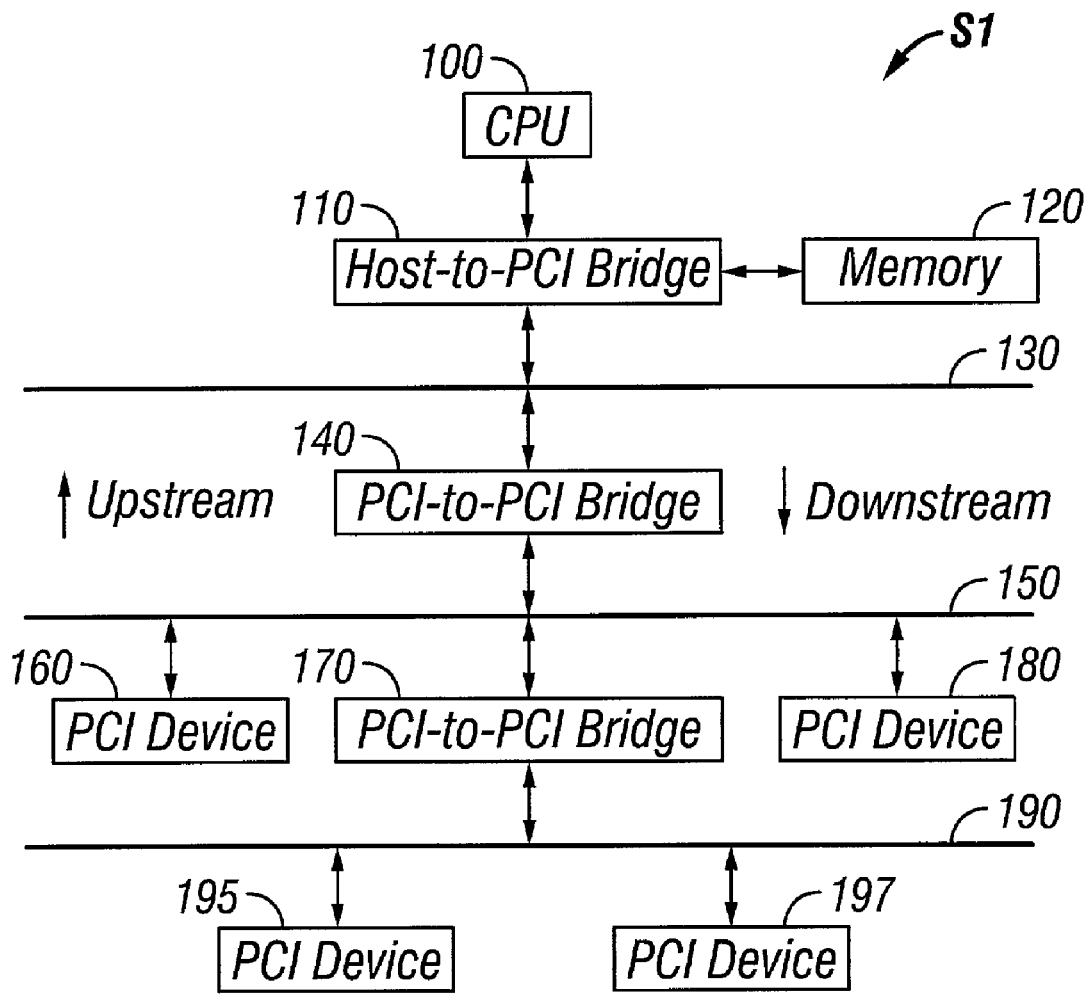
FIG. 1 is a block diagram illustrating a conventional computer system S1 with multiple bridges.

Turning to FIG. 1, a conventional computer system S1 with multiple PCI bus segments is shown. Certain common elements of modern computer systems are omitted for clarity of the description. As shown in FIG. 1, CPU 100 is connected to a Host-to-PCI Bridge 110 to which is also connected a memory 120. The Host-to-PCI bridge 110 is connected to a first PCI bus 130. As used herein, the term primary refers to the side of a device closer to the host processor or CPU 100. The term secondary refers to the side of a device farther from the host processor or CPU 100. Further, the term upstream refers to transactions that are currently flowing towards the CPU 100, e.g., transactions containing a target address of the CPU 100 or the memory 120, while the term downstream refers to a transaction currently flowing away from the CPU 100, e.g. transactions containing a target address of a device on a secondary side of a PCI-to-PCI bridge device. Thus, a transaction initiated by the CPU 100 with a target address of PCI device 160 would be a downstream transaction when discussing the PCI-to-PCI bridge 140. A peer-to-peer transaction is a transaction that is neither initiated by the CPU 100 nor has a target address of the CPU 100 or the memory 120, and is conventionally considered to be a transaction that originates from a PCI end-device such as devices 160, 180, 195, or 197 and targets a PCI end-device such as devices 160, 180, 195, or 197.

A PCI-to-PCI bridge 140 connects bus segments 130 and 150. Although no other devices are shown connected to bus segment 130, one skilled in the art will recognize that other devices can be connected to the bus segment 130. The number and nature of the devices connected to bus segments 130, 150, and 190 are illustrative and exemplary only. The PCI Specification allows up to 32 devices to be connected to each bus segment, although most systems containing a PCI bus can connect fewer devices for electrical reasons.

A secondary bus 150 is connected to the PCI-to-PCI bridge 140. As shown in FIG. 1, two end devices 160 and 180 are connected to the second bus 150. A second PCI-to-PCI bridge 170 connects bus 150 with bus 190 to which are connected PCI end devices 195 and 197. Although the PCI specification allows for 256 bus segments, conventional computer systems and conventional software operating systems have typically been limited to two or three bus segments. Interconnect hierarchies of more than 2 or 3 layers are not typically supported by such operating systems and hardware.

PCI interconnect systems are enumerated at boot time by configurations transactions. The operating system assigns each bus segment of the interconnect bus hierarchy a unique PCI bus number. On each bus or bus segment the specification allows as many as 32 unique devices, each of which may have up to eight functions. Although conventional computer systems do not electrically tie more than 4 to 8 slots to a bus segment, the specification provides for 32 devices on a bus segment.

As part of the configuration process, the configuration software typically builds a picture of the bus "tree" that represents the overall system topology. The system start up configuration software walks the base PCI bus (bus 0) and searches for PCI-to-PCI bridges. When a bridge is discovered, the software "walks" the secondary bus of the bridge in an attempt to discover PCI devices and/or other bridges. The software proceeds with this process until all PCI buses behind the first PCI-to-PCI bridge have been discovered. As each bridge is discovered, the software assigns the bus the next sequential bus number and also updates subordinate bus number registers in each PCI-to-PCI bridge that resides upstream of the newly-discovered bridge (including the host-to-PCI bridge(s)).

When a complete picture of the tree branch that extends behind the PCI-to-PCI bridge has been built, the software searches for other PCI-to-PCI bridges stemming from the first PCI bus and builds pictures of the branch behind each, eventually enumerating each of the bus segments of the system topology. This enumeration allows the bridges to route transactions across the system S1 using the bus numbers. One skilled in the art will understand that this enumeration technique is exemplary and illustrative only, and other enumeration techniques could be used.

Figure 2A:
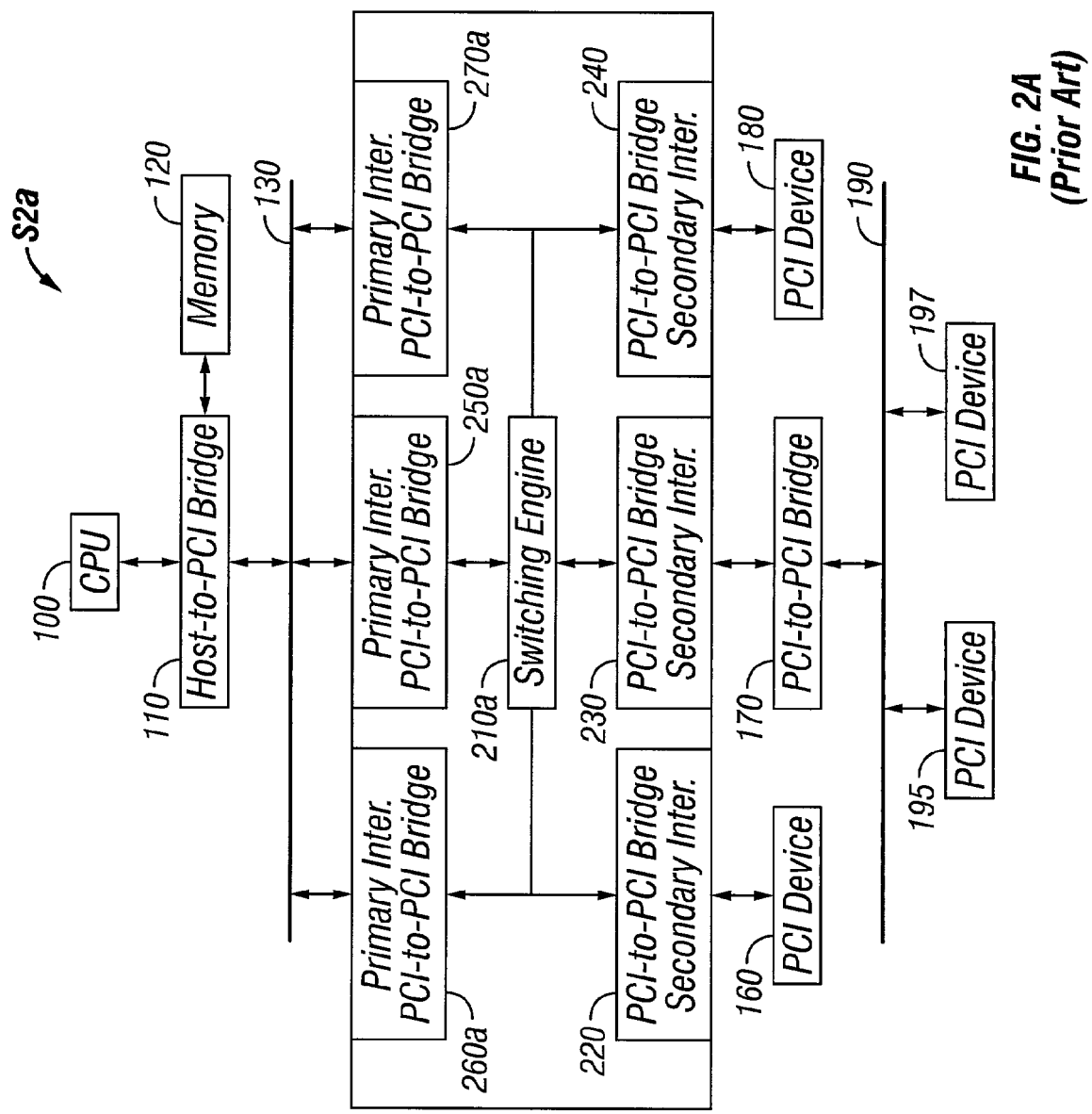
FIG. 2a is a block diagram illustrating a conventional computer system S2a with a switch in a multi-function device.

Turning to FIG. 2a, a block diagram illustrates a computer system S2a similar to the system of FIG. 1 except that the bus 150 and the PCI-to-PCI bridge 140 have been replaced with an exemplary conventional switch 200a using a multifunction device configuration. Items with identical reference numbers are unchanged from FIG. 1. Switch 200a contains a switching engine 210a for routing transactions between primary interface ports 250a, 260a, and 270a and corresponding secondary ports 220a, 230a, and 240a. In order to maintain compatibility with the PCI specification, a primary and secondary port together comprise a PCI function supported by the switch 200a, and form a PCI-to-PCI bridge with the primary and secondary interfaces linked by the switching engine 210a. Although three primary and three secondary ports are shown in FIG. 2a, the PCI specification allows a device to support up to eight functions, thus the switch 200a could support up to eight primary and eight secondary ports. Software in the CPU 100 will then enumerate each of the PCI-to-PCI bridges made by the primary/second ports 260a/220a, 270a/240a, and 250a/230a via configuration transactions at start up time, setting BARs in each of the PCI-to-PCI bridges. Thus, transactions can be routed by the switching engine based on the information stored in the BARs.

Figure 2B:
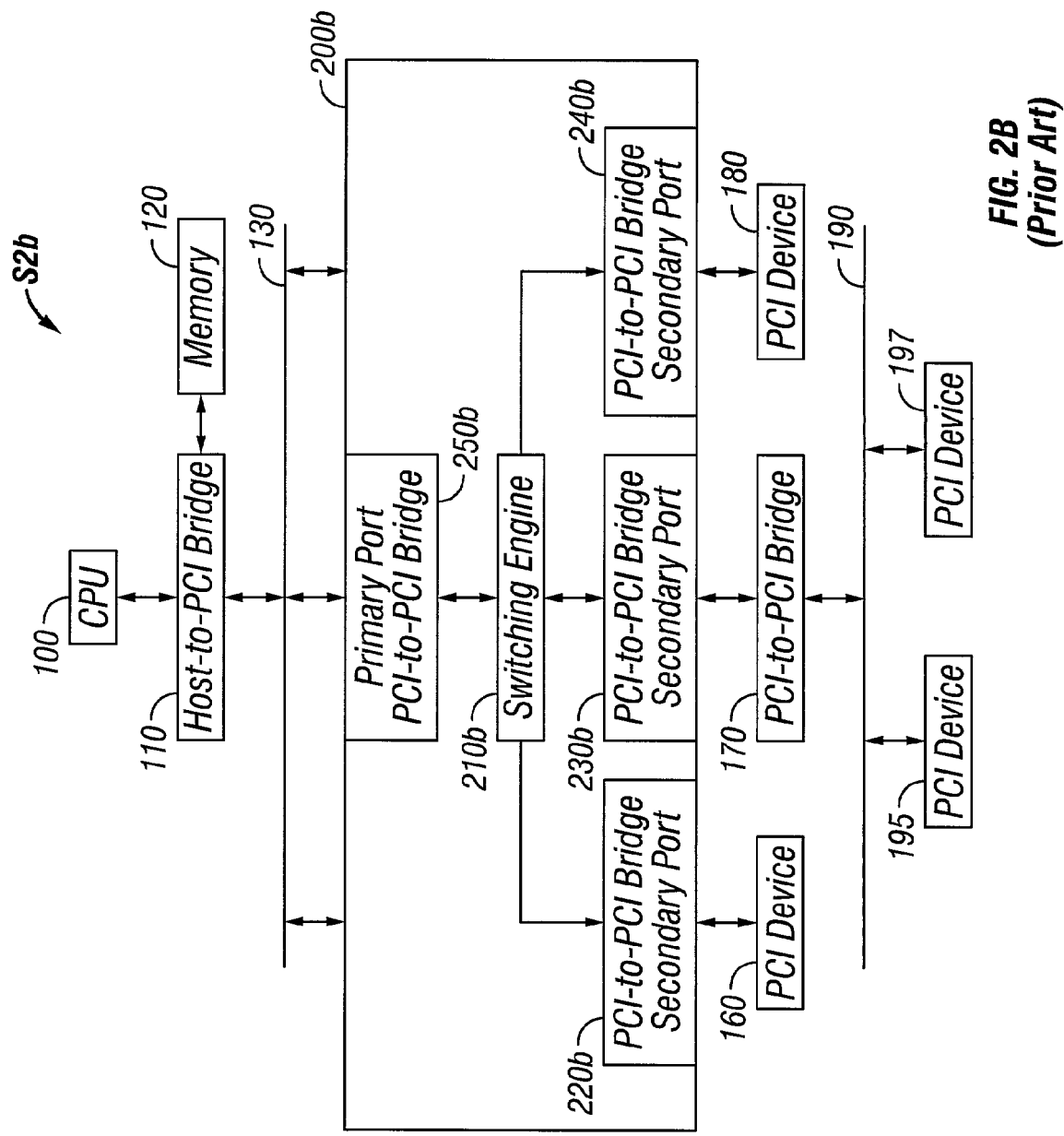
FIG. 2b is a block diagram illustrating a conventional computer system S2b with a switch in a switch device with an internal PCI-to-PCI bridge.

Turning to FIG. 2b, a block diagram illustrates a computer system S2b similar to the system of FIG. 2a except switch 200b is a switch device, with a single primary port 250b and three secondary ports 220b–240b. As in FIG. 2a, items with identical reference numbers are unchanged from FIG. 1. Switch 200b contains a switching engine 210b for routing transactions between primary port 250b and secondary ports 220b, 230b, and 240b across what appears to software to be a single internal PCI bus. In order to maintain compatibility with the PCI specification, both the primary port 250b and the secondary ports 220b–240b behave as PCI-to-PCI bridges. Software in the CPU 100 will then enumerate each of the bridges associated with the ports 220b–250b via configuration transactions at start up time, setting BARs in each of the port bridges. Thus, transactions can be routed by the switching engine based on the information stored in the BARs. Although FIG. 2b shows three secondary ports, the PCI specification would allow up to 31 secondary ports for the switch 200b, any of which could be attached to a PCI-to-PCI bridge.

However, the technique of FIGS. 2a–2b can create difficulties because of the need to assign bus segment numbers to each of the ports, thus, effectively wasting bridge segment numbers for each secondary port. In addition, because conventional software typically does not expect deep hierarchies of PCI-to-PCI bridges, existing operating systems and other software may be unable to handle a hierarchy as deep as shown in FIG. 2b which has four bridges between the CPU 100 and PCI devices 195–197. Further, because each bus segment can theoretically have 30 devices behind it, a switch 200a or 200b as shown in FIGS. 2a–2b could waste 30*(# of ports) of addressable devices in addition to (# of ports) bus numbers. For FIGS. 2a and 2b, just to bring out 3 ports, this switch architecture has lost 3 bus numbers and 90 addressable devices. As shown in FIGS. 2a–2b, this wasting of bus numbers and addressable devices even applies to ports which have single PCI devices attached to them such as PCI devices 160 and 180 connected to ports 220 and 240 as shown in FIGS. 2a–2b.

An alternate approach would be to shadow BARs from PCI devices connected to each of the secondary ports 220–240. However, the complexity and performance of such a device creates significant difficulty for the chip designer. Each port could theoretically require 56 registers to be shadowed, 7 registers for each of the 8 functions possible in a PCI device. However, such a magnitude of registers would require enormous landscape on the chip and cause significant performance degradation for handling the 1,792 registers that would be required for all 31 possible secondary ports each with 56 registers.

Figure 3:
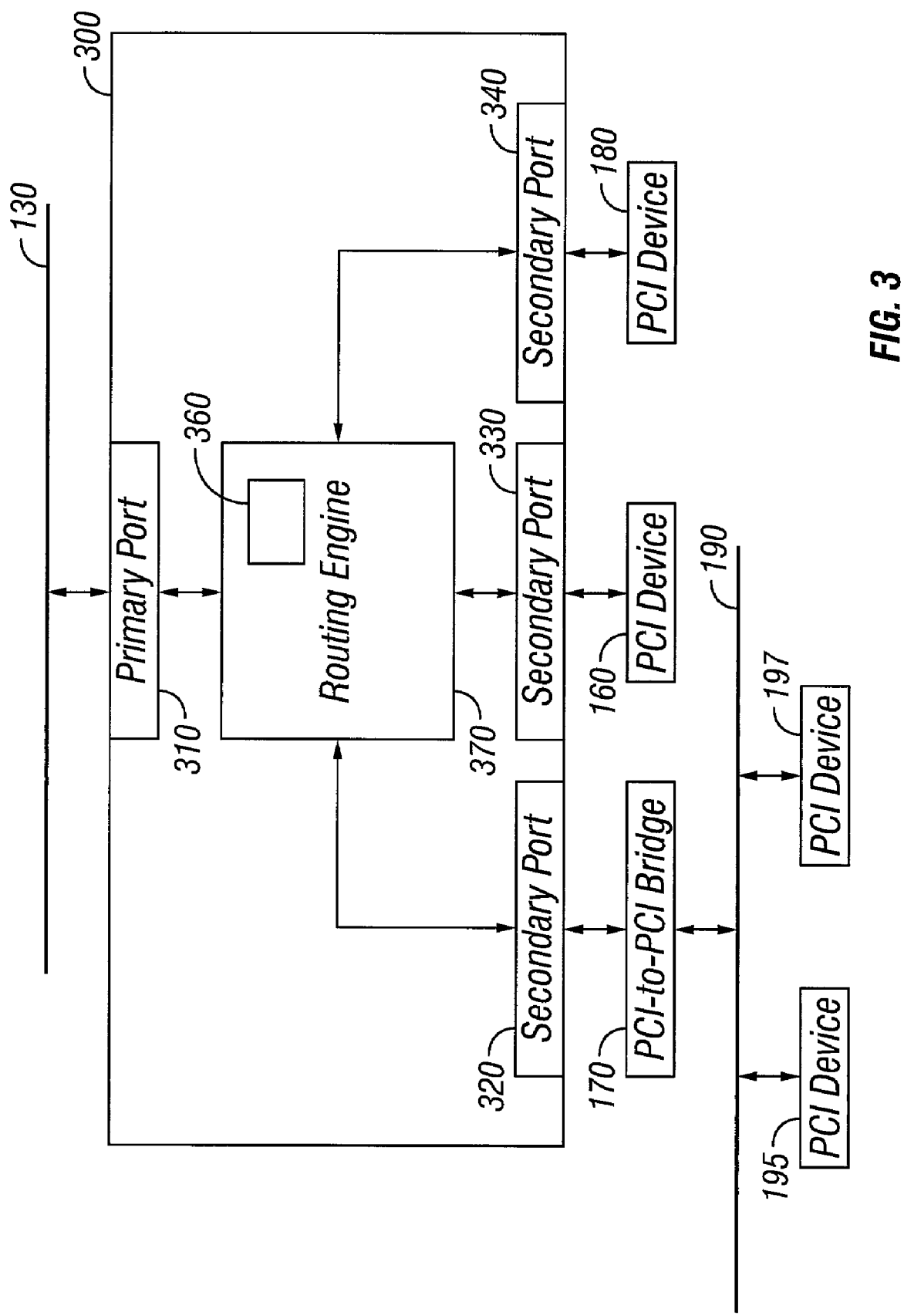
FIG. 3 is a block diagram illustrating an exemplary switch according to one embodiment.

Turning to FIG. 3, a block diagram illustrates an exemplary switch 300 according to one embodiment. Switch 300 is shown with a primary port 310 and three secondary ports 320–340, although as stated above up to 31 secondary ports could be implemented while retaining compatibility with the PCI specification. One skilled in the art will understand that the number and arrangement of ports and associated devices is exemplary and illustrative only, and other numbers and arrangements of ports and devices can be used. However, in contrast to switch 200, switch 300 does not implement secondary ports 320–340 as PCI-to-PCI bridges, nor does the switch 300 need to shadow BARs for the devices connected to all of the ports 320–340. Instead, only port 320 needs to shadow the BARs for the PCI-to-PCI bridge 170 connected to port 320, storing the shadowed registers in shadow registers 360.

As shown below in FIG. 4, the BARs of PCI-to-PCI bridge 170 can be snooped during configuration of bridge 170 setting the values of the shadow registers 360. Other techniques for shadowing the BARs of bridge 170 can be used. When a transaction is received at the primary port 310 switching engine 370 determines whether the transaction is targeted for the PCI-to-PCI bridge 170, using the shadowed BARs 360. If so, switching engine 370 can route the transaction to port 320 and thus to PCI-to-PCI bridge 170 for eventual delivery to PCI devices 195 or 197. If the transaction is not routed to bridge port 320, the switching engine 370 then routes the transaction to each of the non-bridge ports 330–340, giving each of the PCI devices 160 and 180 an opportunity to claim the transactions. As can be seen, this technique significantly decreases the number of shadow registers required by the switch 300, because only the BARs of the PCI-to-PCI bridge 170 must be shadowed. Therefore, the switch 300 can be implemented with lesser complexity, simplifying the design and improving the performance of chip 300. Although the switch of FIG. 3 shows a bridge connected to port 320, PCI-to-PCI bridges could be connected to any or all of the ports 320–340 and detected during the enumeration process described above. In one embodiment, the switch 300 can improve the performance for when multiple PCI-to-PCI bridges are connected to the switch 300 by providing additional shadow registers 360.

Figure 4:
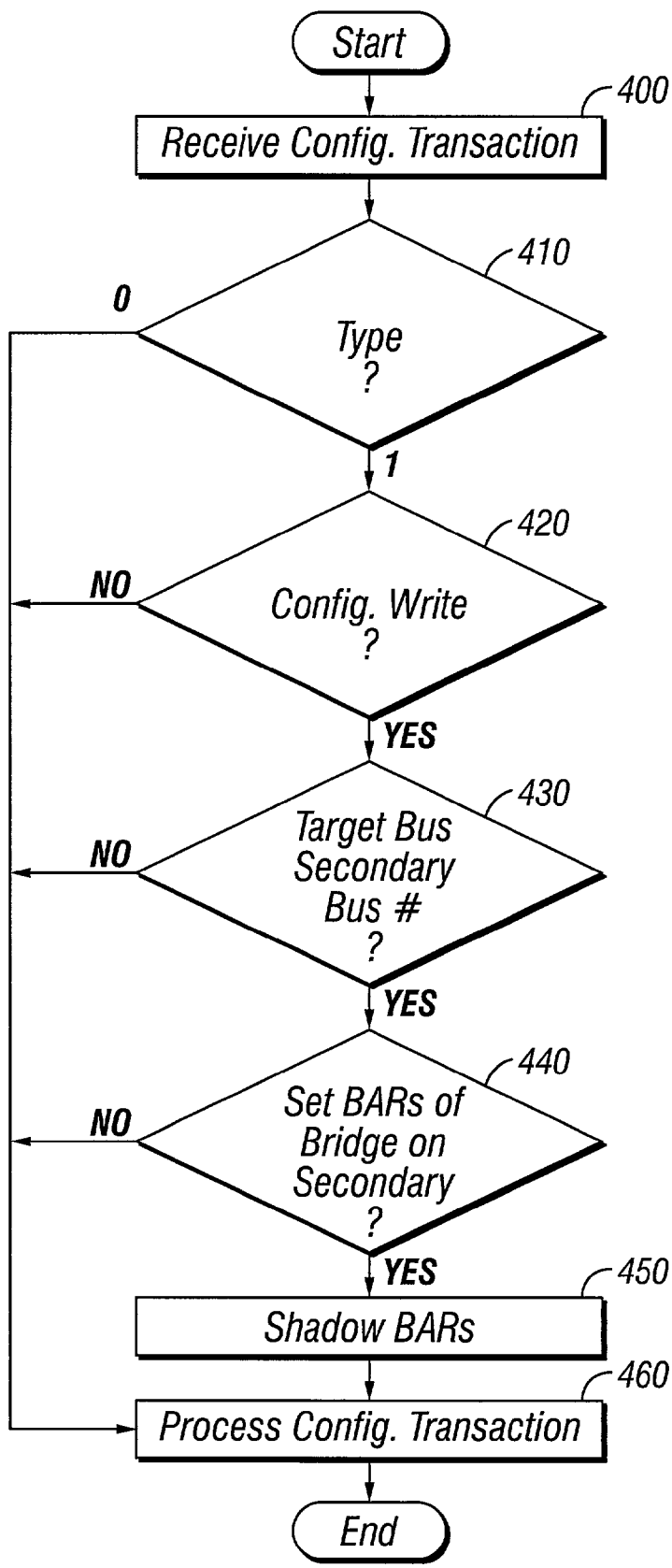
FIG. 4 is a flowchart illustrating processing of configuration transactions according to one embodiment of the switch illustrated in FIG. 3.

FIG. 4 is a flow chart illustrating shadowing of the BARs for PCI-to-PCI bridge 170 of FIG. 3. In step 400, switch 300 receives a configuration transaction through the primary port 310. If the configuration transaction is a type 0 configuration transaction, then the configuration transaction is a configuration transaction for switch 300 as a standard device on its primary interface and is processed in step 460 in the conventional fashion. If the configuration transaction is a type 1 configuration transaction, indicating that the transaction is for a device on the secondary side of switch 300, the configuration transaction is then examined in step 420 to determine if it is a configuration write transaction. If the transaction is not a configuration write transaction, then the configuration transaction is processed in step 460 in the conventional fashion. If the transaction is a configuration write transaction, then step 430 determines whether the target bus number of the transaction is the secondary bus number of switch 300. If not, the configuration write transaction is a transaction for a device on the secondary side of PCI-to-PCI-to-PCI bridge 170 and can be processed in the conventional fashion in step 460. If the transaction has a target bus number of the secondary bus number of switch 300, then in step 440 the transaction is examined to determine if it is setting BARs of bridge 170 attached to secondary port 320. If so, then switch 300 shadows the BARs into the shadow registers 360 of switch 300 before processing the configuration transaction in step 460.

Figure 5:
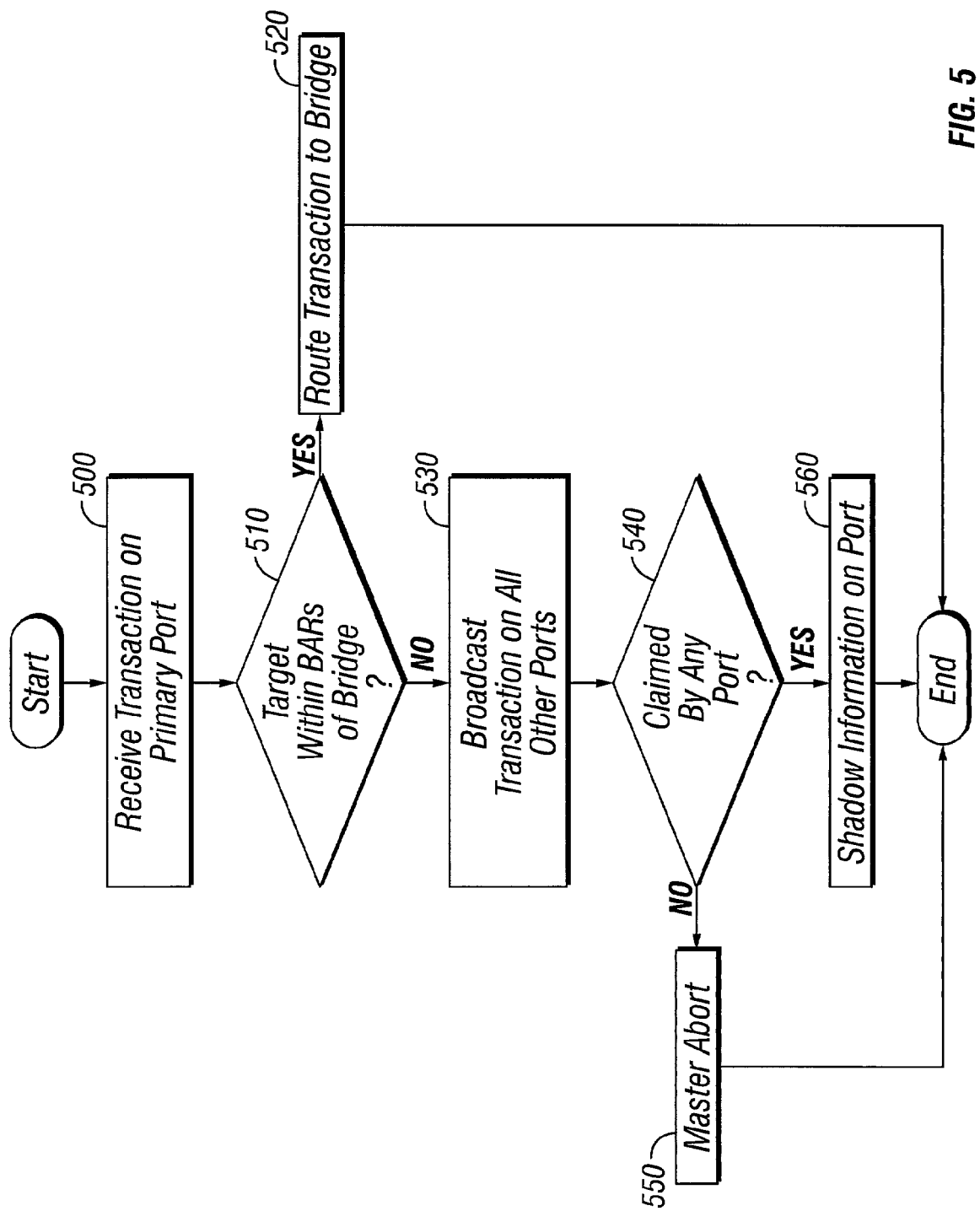
FIG. 5 is a flowchart illustrating routing of transactions according to one embodiment of the switch of FIG. 3.

Turning to FIG. 5, a flow chart illustrates one disclosed technique for routing transactions through the switching engine 370. In step 500, a transaction is received on primary port 310 of switch 300. In step 510, the transaction is examined to determine if the target address is within the BARs of bridge 170 which have been shadowed in shadow registers 360. If it is, then in step 520 the switching engine 370 routes the transaction to bridge secondary port 320 for transmittal to the PCI-to-PCI bridge 170. Otherwise, in step 530, the switching engine 370 broadcasts the transaction on all other secondary ports of the bridge 300. In step 540, switching engine 370 determines whether the transaction was claimed by the end devices 160 or 180 attached to any of the secondary ports 330–340. If no end device 160 or 180 claims the transaction, then in step 550 the switching engine 370 terminates the transaction with a PCI master abort indication. If the transaction was claimed by one of the ports 330–340, then in step 560, switching engine 370 can shadow information regarding the port which claims the transaction. Step 560 is shown with dashed lines because switch 300 is implemented according to one embodiment without step 560. Step 560 allows the bridge 300 to effectively tune the switching engine 370. Further transactions with a target address within the addresses claimed by the end device can be routed directly to the appropriate port, improving performance of the switch. In a further disclosed embodiment, the switching engine 370 may provide more than one set of shadow registers for tuning step 560. In such an embodiment, switching engine 370 can use any convenient algorithm for determining allocation of shadow registers for transactions claimed by one of the secondary ports 330–340. However, in another disclosed embodiment, no additional shadow registers are implemented in switching engine 370, and step 560 is omitted. In such an embodiment, every downstream transaction or peer-to-peer transaction with a target address not serviced by the PCI-to-PCI bridge 170 connected to secondary port 320 will be broadcast to all of the secondary ports 330–340. Note that as stated above, switch 340 can have any number of non-bridge secondary ports to which are connected in devices up to the limit allowed by the PCI specification, although only two such ports are shown in FIG. 3 for clarity of the drawing.

Figure 6:
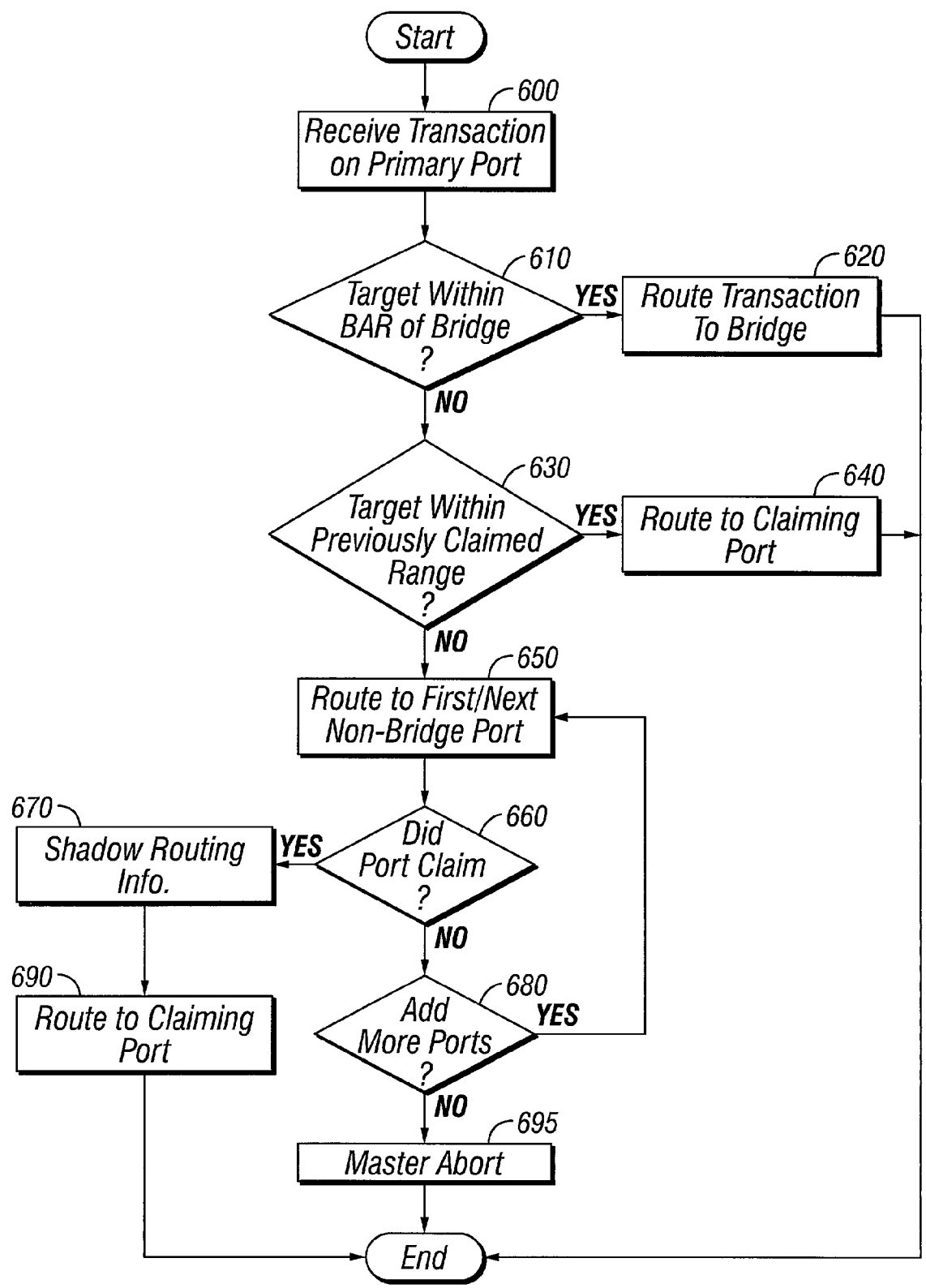
FIG. 6 is a flowchart illustrating routing of transactions according to another embodiment of the switch of FIG. 3.

In another disclosed embodiment, switch 300 successively routes non-bridge transactions to each of the non-bridge ports, until one port claims the transaction. As illustrated by the flowchart of FIG. 6, in step 600, the switch receives a transaction on the primary port 310. In step 610, the switching engine 370 determines whether the target address of the transaction is within the shadowed BAR 360 for the bridge connected to port 320. If it is, then the switching engine 370 routes the transaction to the bridge port 320 in step 620. If not, then in step 630 the switching engine 370 determines whether the target of the transaction is within a previously claimed target range. If it is, then in step 640 the transaction is routed to the port that claims that address in a previous transaction. If not, then the transaction is routed to the first non-bridge port in step 650. In step 660, the switching engine determines whether the device attached to the first non-bridge port claims the transaction. If it does claim the transaction, then in step 670 the switching engine 370 shadows the routing information of the transaction then routes the transaction to the claiming ports in step 690. If the first non-bridge port did not claim the transaction, then in step 680 the switching engine determines if there are any more non-bridge ports. If there are, then in step 650 the transaction is routed to the next non-bridge port. If no more ports are available, then in step 695 the switching engine will terminate the transaction with a master abort. As in FIG. 5, steps 630, 640, and 670 are shown in dashed lines to indicate that these steps can be omitted in a disclosed embodiment.

The foregoing disclosure and description of the preferred embodiment are illustrative and explanatory thereof, and various changes in the components, circuit elements, circuit configurations, and signal connections, as well as in the details of the illustrated circuitry and construction and method of operation may be made without departing from the spirit and scope of the invention.

I claim:

1. A method of switching transactions on an interconnect switch, the interconnect switch having a primary port connected to a primary interconnect, a first secondary port connected to a bridge, and a plurality of end-device secondary ports, each connectable to one of a plurality of end devices, the method comprising the steps of:
identifying a transaction from the primary port as a bridge transaction or a non-bridge transaction;
routing the bridge transaction to the bridge through the first secondary port; and
routing the non-bridge transaction to at least one of the plurality of end device secondary ports,
wherein the transaction has a target address, and wherein the step of identifying a transaction as a bridge transaction or a non-bridge transaction comprising the steps of:
shadowing registers of the bridge with a plurality of shadow registers in the interconnect switch;
if the target address is mapped by the shadow registers, identifying the transaction as a bridge transaction; and
if the target address is not mapped by the shadow registers, identifying the transaction as a non-bridge transaction.

2. The method of claim 1, the step of shadowing registers comprising the step of:
shadowing base address registers of the bridge in the switch, the base address registers of the bridge mapping addresses associated with a secondary interconnect of the bridge.

3. The method of claim 1, the step of shadowing comprising the step of:
snooping a configuration transaction that configures base address registers of the bridge; and
copying base address register information obtained in the snooping step to the shadow registers.

4. The method of claim 1, the step of routing a non-bridge transaction comprising the step of:
broadcasting the non-bridge transaction to each of the plurality of end-device secondary ports.

5. The method of claim 1, the step of routing a non-bridge transaction comprising the step of:
successively routing the non-bridge transaction to each of the end-device secondary ports until the non-bridge transaction is claimed by a first end device connected to a first end-device secondary port.

6. The method of claim 5, wherein the non-bridge transaction has a target address, further comprising the steps of:
identifying an address range associated with the first end device;
routing further non-bridge transactions with a target address within the address range to the first end-device secondary port; and
successively routing further non-bridge transactions with a target address outside the address range to each of the other plurality of end-device secondary ports until claimed by another end device.

7. The method of claim 1, wherein the transaction is a peer-to-peer transaction.

8. The method of claim 1, wherein the transaction is a downstream transaction.

9. An interconnect switch, comprising:
a primary port, to couple to a primary bus segment;
a switch engine coupled to the primary port;
a secondary-bridge port configured to couple to a secondary bus segment; and
one or more secondary-end-device ports each configured to couple to an end device;
wherein the switch engine comprises:
circuitry to receive a transaction, the transaction having a target address;
circuitry to decode the target address;
circuitry to route the transaction to the secondary-bridge port if the circuitry to decode the target address decodes the target address as directed to the secondary bus segment; and
circuitry to route the transaction to at least one of the one or more secondary-end-device ports if the circuitry to decode the target address decodes the target address as not directed to a bridge.

10. The interconnect switch of claim 9, wherein the circuitry to route the transaction to at least one of the one or more secondary-end-device ports comprises circuitry to broadcast the transaction to a plurality of secondary-end-device ports.

11. The interconnect switch of claim 9, wherein the circuitry to route the transaction to at least one of the one or more end-device ports comprises circuitry to successively route the transaction to each of the one or more secondary-end-device ports until the transaction is claimed by a claiming end device.

12. The interconnect switch of claim 11, wherein the circuitry to route transactions to at least one of the one or more secondary-end-device ports further comprises:
   circuitry to store an end-device address range associated with the claiming end device;
   circuitry to route further transactions to the claiming end device if the target address is within the end-device address range.

13. The interconnect switch of claim 9, wherein the transaction is a downstream transaction.

14. The interconnect switch of claim 9, wherein the transaction is a peer-to-peer transaction.

15. The interconnect switch of claim 9, comprising two or more secondary-end-device ports.

16. A system, comprising:
   a processor;
   a memory coupled to the processor;
   an interconnect bus coupled to the processor, the interconnect bus comprising:
      a primary bus segment coupled to the processor;
      a switch having a primary side with a primary port coupled to the primary bus segment and a secondary side with a plurality of secondary ports, the switch comprising a routing engine configured to selectively transmit a transaction from the primary port to at least one secondary-port of the plurality of secondary ports based on whether the transaction is targeted for a bridge,
   wherein the switch comprises:
      a shadow register;
      circuitry configured to snoop at least a portion of a target address of a transaction that passes through a bridge connected to one of the plurality of secondary ports; and
      circuitry configured to compare the snooped portion of the target address with at least a portion of a target address of an unclassified transaction to identify the unclassified transaction as a non-bridge transaction.

17. The system of claim 1, comprising a secondary bus segment coupled to one of the plurality of secondary ports and an end device coupled to another one of the secondary ports.

18. The system of claim 1, wherein the switch comprises circuitry configured to store the snooped portion of the target address in a shadow register.

* * * * *

UNITED STATES PATENT AND TRADEMARK OFFICE
CERTIFICATE OF CORRECTION

PATENT NO. : 7,110,413 B2  Page 1 of 1
APPLICATION NO. : 10/038793
DATED : September 19, 2006
INVENTOR(S) : Dwight D. Riley It is certified that error appears in the above-identified patent and that said Letters Patent is hereby corrected as shown below:

In column 8, line 42, Claim 9, delete "to couple" and insert -- configured to couple --, therefor.

In column 10, line 18, Claim 17, delete "claim 1," and insert -- claim 16, --, therefor.

In column 10, line 22, Claim 18, delete "claim 1," and insert -- claim 16, --, therefor.

Signed and Sealed this
Twenty-seventh Day of September, 2011

David J. Kappos
*Director of the United States Patent and Trademark Office*